Figure 1:
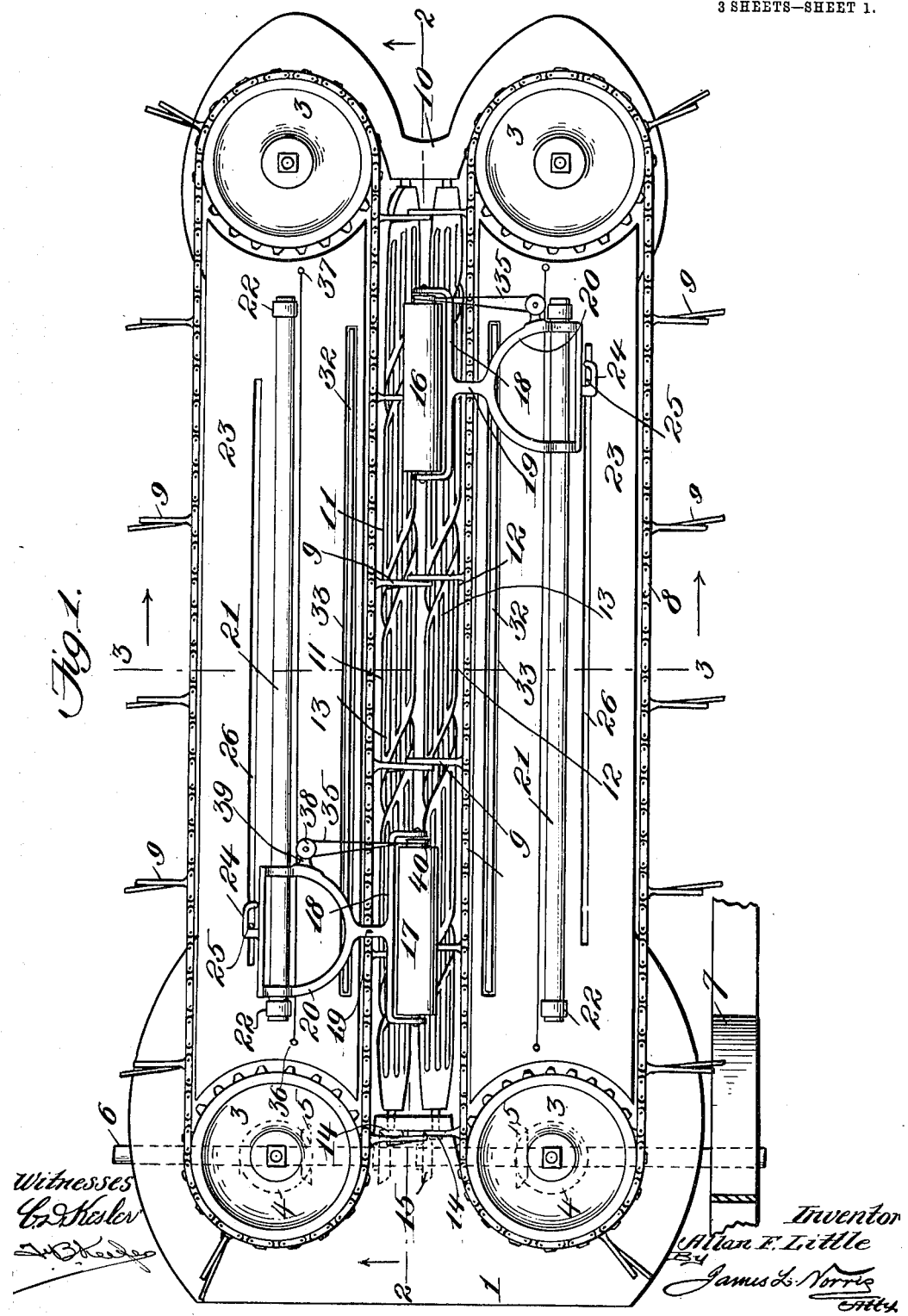

No. 870,972.  
PATENTED NOV. 12, 1907.

A. F. LITTLE.  
SAUSAGE LINKING MACHINE.  
APPLICATION FILED OCT. 4, 1906.

3 SHEETS—SHEET 2.

Fig. 2.

Witnesses:  
C. D. Kesler  
H. B. Keeler

Inventor  
Allan F. Little  
By James L. Norris  
Atty

No. 870,972. PATENTED NOV. 12, 1907.
A. F. LITTLE.
SAUSAGE LINKING MACHINE.
APPLICATION FILED OCT. 4, 1906.
3 SHEETS—SHEET 3.
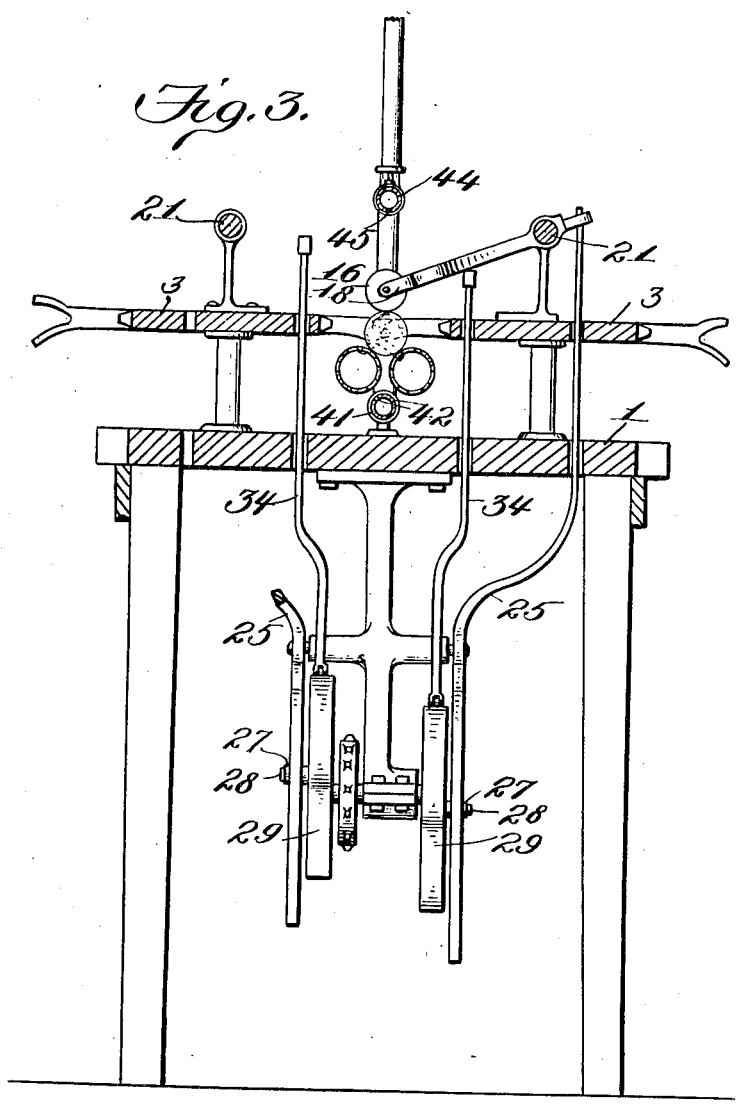
Fig. 3.
Witnesses:
Inventor
Allan F. Little
By
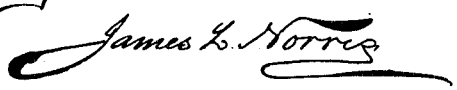
Atty.

UNITED STATES PATENT OFFICE.

ALLAN F. LITTLE, OF KANSAS CITY, MISSOURI.

SAUSAGE-LINKING MACHINE.

No. 870,972.  Specification of Letters Patent.  Patented Nov. 12, 1907.

Application filed October 4, 1906. Serial No. 337,447.

*To all whom it may concern:*

Be it known that I, ALLAN F. LITTLE, a citizen of the United States, residing at Kansas City, in the county of Jackson and State of Missouri, have invented new and useful Improvements in Sausage-Linking Machines, of which the following is a specification.

This invention relates to machines for dividing a filled sausage casing into sections or links of a desired length and then twisting the same, whereby they will permanently retain their divided or linked form; and aims to provide a machine of such class with means, as hereinafter set forth, to prevent foreign matter, such as loose meat lodging between the sausage casing and the twisting rollers so as to prevent clogging of the machine which would retard its operation; and, further to prevent loss of friction between the sausage casing and rollers so that the twisting operation will be had in a satisfactory manner at all times.

The invention further aims to provide a machine for the purpose set forth which shall be comparatively simple in its construction, strong, durable, efficient in its use, provided with means to prevent the retarding of the linking and twisting operation, readily set up and comparatively inexpensive.

With the foregoing and other objects in view, the invention consists of the novel construction, combination and arrangement of parts hereinafter more specifically described and illustrated in the accompanying drawings, wherein is shown the preferred embodiment of the invention, but it is to be understood that changes, variations and modifications can be resorted to which come within the scope of the claims hereunto appended.

In describing the invention in detail reference is had to the accompanying drawings wherein like reference characters denote corresponding parts throughout the several views, and in which—

Figure 1 is a top plan view of a sausage-linking machine in accordance with this invention. Fig. 2 is a section on line 2—2 of Fig. 1. Fig. 3 is a section on line 3—3 of Fig. 1.

Referring to the drawings by reference characters, 1 denotes the support or base upon which is mounted the means for linking and twisting the filled sausage casing and at each end of said support or base 1 is positioned in any suitable manner a pair of vertically-extending uprights 2, upon each of which is rotatably mounted a sprocket wheel 3. One pair of sprocket wheels is provided with the beveled gears 4 meshing with the beveled gears 5 carried by a drive shaft 6 journaled in the machine frame, the shaft having on one end a pulley 7 adapted to be connected to a prime mover, not shown. One of the sprocket wheels 3 at one end of the machine is connected with an opposing sprocket wheel 3 at the other end of the machine through the medium of an endless chain belt 8 and the same connection is had between the other pair of sprocket wheels. From such arrangement of parts it is evident that when motion is imparted to the shaft 6 the gears 4 and 5 will be driven, consequently rotating one pair of sprocket wheels 3, and the latter through the medium of the belt connections 8 will impart motion to the other pair of sprocket wheels 3.

Secured upon each of the belts 8 at certain predetermined distances are gripping jaws 9, which are so arranged that their out ends will intersect one with the other when moving in a central path between the opposite belts, as more clearly shown in Fig. 1. The outer ends of each of the gripping jaws are substantially V-shaped and when motion is imparted to the belts 8 the said jaws 9 will be caused to grip the filled sausage casing and carry or feed the same with a continuous movement through the machine while the sausage is being twisted and linked, and in this connection it will be stated that when a filled sausage casing is guided in the front end of the machine through a trough 10 to a position to be gripped between the moving jaws 9, two of the jaws are brought to a position opposite each other after being carried around the sprocket wheels at the front end of the machine. When the end of the sausage casing is thus gripped it is carried forward by the moving jaws between the two belts so that as the succeeding jaws come opposite each other they also grip and compress the sausage casing so as to carry or feed the same, and also divide the filled casing into sections or links of the desired length.

In order to twist the divided links whereby they will permanently retain their divided or linked form, a pair of spiral rolls and a pair of traveling holding rolls, which alternately engage the links, are provided. The spiral rolls are indicated by the reference characters 11, 12 and are arranged in parallelism with respect to each other, and furthermore are intermittently slotted throughout their entire length as at 13 (best shown in Fig. 2). The spiral rolls 11, 12 are of what may be termed a shell-like formation and at one end are rotatably mounted in the front end of the machine and at their other end are also rotatably mounted in the rear end of the machine, but each carries a beveled pinion 14- meshing with the beveled gears 15 carried by the shaft 6. The spiral rolls 11, 12 are geared up so that they will both rotate simultaneously and in the same direction.

The holding-down rolls are indicated by the reference characters 16, 17. Each of these rolls is journaled in a bearing bracket 18 connected by a coupling piece 19 to a curved carrier 20, shiftably mounted upon the stationary guide rod 21 fixed to brackets 22 secured to the supporting plate 23. There is a supporting plate 23 on each side of the machine and which are supported above the base by suitable uprights, (see Fig. 3). The carrier 20 is formed with the hook-shaped extension 24, which is engaged by shifting rod 25 for reciprocating the carrier, thereby moving the holding roll longitudinally of the machine in either direction. The shifting rod 25 operates through an elongated slot 26 formed in the supporting plate 23 and is operated through the medium of a roller 27, carried by a stud 28, eccentrically mounted upon the cam 29, which is fixed to a rotatable shaft 30 driven in any suitable manner and supported below the base 1 of the machine. The rod 25 has its lower end bifurcated, as at 31, and in this bifurcated end 31 operates the roller 27. From such assemblage of parts it will be evident that when the cam 29 is rotated the carrier 20 will be reciprocated. The holding-down rolls 16 and 17 are arranged over the spiral rolls 11 and 12 and the function thereof is to hold down the links against the spiral rolls 11 and 12 so that the necessary friction between the rolls will be had to prevent the link from slipping, thereby enabling the link to be properly twisted. The holding-down rolls alternately operate—that is to say, when the roll 16 is moved to operative position to hold down the link the roll 17 is being elevated from the link and shifted towards the front end of the machine. To enable the alternate elevating of the holding-down rolls 16 and 17 an elevating bar 32 for each carrier 20 is provided. These bars alternately operate and pass through slots 33 in the supporting plate 23. Each of the bars 32 is operated by a vertically-extending rod 34, which is secured to its respective bar 32 and is actuated by the cam 29 as will be evident by reference to Fig. 2. The bar 32 is positioned below the carrier 20 so that when the bar is elevated the carrier will be also raised, thereby moving one holding-down roll out of the path of the other holding-down roll. Each of the holding-down rolls is rotated through the medium of a flexible member 35, which is fixed at one end as at 36, to the supporting plate 23 and at its other end, as at 37, to the said plate 23. The member 35 passes over a roller 38 carried by a protuberance 39 projecting from the carrier and then passes over an extension 40 on the holding-down roll, as shown in Fig. 1. It will be evident from such an arrangement that when the holding-down roll is shifted in one direction it will be caused to revolve owing to the manner in which the flexible member is connected to the holding-down roll, and when the holding-down roll is shifted in the opposite direction it will also be caused to rotate.

To prevent foreign matter, such as loose meat, when the sausage casing breaks, from lodging between the sausage casing and the spiral and holding-down rolls so as to prevent clogging of the rolls which would retard the operation of the machine, and to further prevent less of friction between the sausage casing and the rolls so that the twisting operation will be had in a satisfactory manner at all times so that it will not be necessary to slacken the motion or stop the machine to remove the loose meat and clean the rolls, a compressed air pipe 41 is provided, which extends in a longitudinal direction and is positioned in the center and immediately beneath the two spiral rolls. The air pipe 41 is perforated at the top on both sides, as at 42, and the openings are so disposed that the air is discharged at an angle on both of the spiral rolls simultaneously, thereby cleaning the rolls from any loose sausage meat and any foreign substance while the machine is in operation. The compressed air is not continuously discharged on the rolls, but is controlled by a valve 43 and by such arrangement the air can be turned on instantaneously. A compressed air supply pipe which is positioned over the holding-down rolls 16 and 17 is also provided and the said pipe is indicated by the reference character 44. The pipe 44 is perforated on the under side, as at 45, and the discharge of the air from the pipe 44 is controlled by the cut-off 46. It will be evident that the air discharged through the openings in the pipe 44 will clean the meat off the holding-down rolls. The pipe 44 is located in such a manner with respect to the holding-down rolls as to not interfere with their free movement of sliding back and forth on the guide bar.

Owing to the manner of mounting the holding-down rolls any size filled sausage casing can be linked and twisted by the machine which would not be the case if the holding-down rolls could not swing as the arrangement heretofore set forth provides, and by setting up the holding-down rolls in the manner as pointed out it is not necessary to provide means for separate adjustment as the holding-down rolls will automatically adjust themselves with respect to the varying sized filled sausage casing.

The machine is adapted to twist every alternate link, and in such connection it will be stated that the holding-down roll 16 and the holding-down roll 17 engage every alternate link, consequently as the other links are not held down there is nothing to create friction so as to cause the twisting thereof. As the links move towards the rear end of the machine the holding-down rolls travel therewith, as will be evident and when one of the rolls has reached the limit of its movement in one direction the other holding-down roll has been shifted to engage a link at the forward end of the machine. This operation is continued as long as it is desired. The pressure of the holding-down rolls upon the links is such as not to break the sausage casing, but sufficient to obtain the desired friction between the link spiral twister rolls and holding-down rolls, so that during the rotation of the spiral twister rolls the links will be twisted, which would not be the case if the twister rolls were slipped past the link. The holding-down rolls are positioned over the space between the spiral twister rolls, the said space being of a width as not to allow a sausage casing to fall through and so that both twister rolls will engage the link and twist it in connection with the holding-down roll which travels with the link against which it is bearing.

The employment and arrangement of the cleaning device will enable the removal of the loose sausage meat and other foreign substance from the spiral rolls without slacking the motion or stopping the machine. This is an advantage owing to the fact that in certain machines it is necessary to bring them to a standstill in order to remove the loose sausage and clean the rolls and as such action consumes time and retards the operation of the machine, as well as causing the sausage casing to pass through the machine untwisted, as when a spiral roll becomes clogged with loose sausage or other foreign matter, it has no friction to turn the sausage casing, so therefore, by the arrangement of cleaning device all loose sausage and other foreign substance is removed from the rolls while the machine is in operation, thereby preventing the loss of friction and the retarding or discontinuing of the twisting or linking operation.

What is claimed is—

1. A sausage linking machine having a pair of rotatable and longitudinally-slotted hollow spiral twister rolls, and means above and below said rolls for discharging air thereon and therethrough thereby cleaning them.

2. A sausage linking machine having a pair of rotatable, hollow twister rolls each having a spiral passage and provided with slots.

3. A sausage linking machine having a plurality of rotatable and slotted twister rolls, and means arranged above and below the rolls for discharging air therethrough so as to clean them.

4. A sausage linking machine having a sausage twisting means embodying a rotatable link holding-down element, and means for reciprocating said element longitudinally of the machine.

5. A sausage linking machine a pair of twister rolls, means for rotating the said rolls in the same direction and a pair of alternately-operating holding-down rolls arranged in operative relation with respect to said twister rolls.

6. A sausage linking machine having a pair of twister rolls, means for rotating said twister rolls in the same direction, a pair of alternately-operating holding-down rolls arranged in operative relation with respect to said twister rolls, and means for discharging a cleansing medium upon the rolls to remove foreign matters.

7. In a machine of the character described the combination of linking jaws, a pair of twister rolls, a pair of holding-down rolls, and means for moving said holding-down rolls alternately to operative position with respect to said twister rolls.

8. In a machine of the character described, the combination of linking jaws, a pair of rotatable twister rolls, a pair of holding-down rolls, means for moving said holding-down rolls alternately to operative position with respect to the twister rolls during the operation of the latter, and means arranged in operative relation with respect to the twister and holding-down rolls for discharging a cleansing medium thereon to remove foreign substances during the operation of said rolls.

9. A machine of the character described having a pair of rotatable holding-down rolls alternately reciprocating in opposite directions, combined with rotatable spiral twister rolls arranged below the holding-down rolls and cooperating therewith, and traveling linking devices arranged in pairs and adapted to extend into said twister rolls.

10. A machine of the character described having a pair of rotatable link holding-down rolls reciprocating alternately in opposite directions, combined with rotatable spiral twister rolls arranged below and cooperating with said holding-down rolls, traveling linking jaws arranged in pairs and adapted to extend into the spiral rolls, and means arranged in operative relation with respect to the holding-down rolls and twister rolls for discharging air upon the rolls during the operation thereof thereby removing foreign matters without discontinuing the operation of the machine.

11. A machine of the character described having a pair of spiral rolls, holding-down rolls associating therewith, pivoted supports for said holding-down rolls, means for alternately moving said holding-down rolls in opposite directions, and a support for said elements.

12. A machine of the character described having a pair of rotatable spiral link twister rolls, rotatable holding-down rolls arranged above the spiral rolls and cooperating therewith, pivoted supports for said holding-down rolls, means for alternately reciprocating said holding-down rolls in opposite directions, and means arranged in operative relation with respect to said rolls for discharging a cleansing medium thereon without discontinuing the operation of the machine.

13. A machine of the character described having a pair of spiral twister rolls, means for moving the said rolls in the same direction, rotatable holding-down rolls arranged over the twister rolls and cooperating therewith, pivoted supports for said holding-down rolls, means for alternately reciprocating said holding-down rolls in opposite directions causing thereby the rotating of said rolls, means arranged in operative relation with respect to said twister and holding-down rolls for discharging a cleansing medium thereon to remove foreign bodies without discontinuing the operation of the machine, and linking devices cooperating with said twister and holding-down rolls.

14. A machine of the character described having a plurality of rotatable and reciprocatory holding-down rolls, pivoted supports for said rolls to allow of one of the rolls being moved out of the path of the other of the rolls, means for reciprocating the rolls thereby causing the rotation thereof, means for moving one roll out of the path of the other roll during the reciprocation of the rolls, a pair of spiral twister rolls arranged below the holding-down rolls and cooperating therewith, means for moving said spiral rolls in the same direction, and linking devices cooperating with said rolls.

15. A machine of the character described having reciprocatory holding-down rolls, pivoted supports for said rolls, means for reciprocating the rolls, means for moving one roll out of the path of the other during the reciprocation of the rolls, a pair of spiral rolls associating with said holding-down rolls, means for moving said spiral rolls in the same direction, and means for discharging a cleansing medium upon the rolls to remove foreign matters therefrom.

16. A machine of the character described having reciprocatory holding-down rolls, pivoted supports for said rolls, means for reciprocating the rolls, means for moving one roll out of the path of the other during the reciprocation of the rolls, a pair of spiral rolls associating with said holding-down rolls, means for moving said spiral rolls in the same direction, and means for discharging a cleansing medium upon said rolls thereby removing foreign matters therefrom, and traveling jaws associating with the spiral and holding-down rolls.

17. A sausage linking machine having a pair of rotatable slotted hollow spiral twister rolls and means arranged in operative relation with respect to said rolls for discharging a cleansing medium thereon and therethrough to remove foreign matters therefrom without discontinuing the operation of the machine, and rotatable and reciprocatory holding-down means arranged in operative relation with respect to said rolls.

18. A sausage linking machine having a pair of rotatable hollow twister rolls each having a spiral passage and further provided with slots, linking jaws adapted to travel through said passage, and link holding-down means arranged in operative relation with respect to said rolls.

In testimony whereof I have hereunto set my hand in presence of two subscribing witnesses.

ALLAN F. LITTLE.

Witnesses:
JOHN C. GAGE,
WILLARD P. HALL.